US006430591B1

(12) United States Patent
Goddard

(10) Patent No.: US 6,430,591 B1
(45) Date of Patent: *Aug. 6, 2002

(54) SYSTEM AND METHOD FOR RENDERING ELECTRONIC IMAGES

(75) Inventor: Kirk Goddard, Bellevue, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,959

(22) Filed: May 30, 1997

(51) Int. Cl.[7] .................................................. G06F 9/00
(52) U.S. Cl. ......................................................... 709/102
(58) Field of Search ................................. 709/100, 102, 709/104, 105, 319, 320, 328, 329, 107, 108

(56) References Cited

U.S. PATENT DOCUMENTS

| | | | | |
|---|---|---|---|---|
| 5,546,541 A | * | 8/1996 | Drew et al. ................. | 709/104 |
| 5,608,874 A | * | 3/1997 | Ogawa et al. ............... | 707/201 |
| 5,724,070 A | * | 3/1998 | Denninghoff et al. ....... | 345/202 |
| 5,768,487 A | * | 6/1998 | LeClair et al. .............. | 395/116 |
| 5,778,372 A | * | 7/1998 | Cordell et al. .............. | 707/100 |
| 5,907,837 A | * | 5/1999 | Ferrel et al. .................... | 707/3 |

* cited by examiner

Primary Examiner—Dung C. Dinh
(74) Attorney, Agent, or Firm—Woodcock Washburn LLP

(57) ABSTRACT

A system and method for downloading compressed images from an Internet server to a consumer's computer is described. Two Windows® threads manage the process of downloading, decompressing and rendering images to the consumer's display. A first binding thread manages communication between the server computer and the consumer's computer, while a second worker thread oversees decompressing and rendering all of the images. The downloaded images are sent by the binding thread to a temporary buffer, wherein the worker thread instructs a decoder object to begin processing all of the data within the specified buffer. As the decoder object decompresses the data in the buffer, the decompressed image data is sent to a bitmap file. A rendering object reads the bitmap file and paints the downloading image to the consumer's display.

23 Claims, 7 Drawing Sheets

SYSTEM AND METHOD FOR RENDERING ELECTRONIC IMAGES

BACKGROUND OF THE INVENTION

1. Field of the Invention

The present invention relates to methods for transmitting compressed files across a wide area network. More specifically, the present invention relates to methods for downloading electronic images across the Internet.

2. Description of the Related Art

As the popularity of wide area networks such as the Internet has increased, the need for efficient data communication between computers has also grown. Current computer systems include telephone modems that communicate through the public telephone system at 56,000 bits per second and faster. Ten years ago, standard telephone modems communicated at 300 bits per second. The need for faster data communication has been driven by the complexity of data being transmitted across wide area networks.

One wide-area network that transmits very complex data is the Internet. The Internet can be used to transmit images, sounds and even full motion video. Normally, consumers accessing the Internet use browsing software (a "Browser") such as the Internet Explorer® from Microsoft® Corporation. Browsing software allows consumers to easily view complicated documents that include pictures, sounds, and video.

However, complicated documents can contain one hundred thousand to one million bytes of information, or greater. Thus, it has become increasingly important for consumers to have faster access to the Internet so that they can receive complicated documents in a timely manner.

Others have attempted various mechanisms for increasing the perceived speed of viewing complicated documents across the Internet. For example, most images to be transferred across the Internet are compressed so that a smaller number of bytes are actually transmitted to the consumer's computer. Once the compressed image has been transmitted to the consumer's computer, it is decompressed and rendered to the consumer's display. This is known in the art as data compression.

Using this compression/decompression mechanism decreases the number of bytes transmitted across communication lines, thereby reducing the data transfer time. Although data compression has several advantages, it also poses many problems. Specifically, compressed images can require a long lag time before they are rendered to the screen. This lag time between downloading and rendering an image is called the decompression time.

Some computer systems decompress compressed imagery synchronously. During the decompression time, the entire program is dedicated to this single compression task. The program is unable to perform other tasks until the entire image is decompressed and thus made ready to be rendered on the consumer's computer screen. While this method of download, decompression and rendering is simple to implement in programming code, it can prove frustrating for the consumer since every image must be rendered before the computer moves on to other tasks.

One way around this problem has been to design programs so that decompression and other program functions are processed in a round-robin fashion. The program loops among the various sub-tasks, with each task being designed to process data for a short period of time before returning to the controlling loop. This method of time sharing is called non-preemptive multi-tasking. Since each sub-task must yield willingly to other pending tasks, the user's computer is shared in a non-preemptive manner. The disadvantage of this approach is that the sharing among programs happens with a coarse granularity so that the consumer sees halting processes. Images are rendered as the program attempts to perform pieces of all the pending tasks.

Because of the problems discussed above in synchronously decompressing files downloaded from the Internet, other systems have been developed in an attempt to reduce file decompression and rendering times. One development has included the ability to download and decompress each file asynchronously from an Internet server to the consumer's computer. By asynchronously downloading files, only small packets of each image, sound, or video file are sent from the Internet server to the consumer's computer at a time. Each packet is thereafter compiled and decompressed on the consumer's computer to recreate the original file. By only sending portions of the file at a time, two files can be sent simultaneously from the Internet server to the consumer's computer by interleaving packets from each file. For example, an Internet server might simultaneously send an image file and a voice file to the consumer's computer by interleaving the data packets from each file.

To handle the multiple files that are being sent from the Internet server with modern PC operating systems, the browser program can be designed to spawn a new thread to decompress each asynchronous image. As is known, "threads", are individual units of execution that run within a process (user program) on a computer. These units of execution have a desirable characteristic in that one thread may preempt another at any time. Operating systems that have the ability to run many threads simultaneously are called "multithreaded" systems. Preemptive multithread programs tend to have better perceived response time to the consumer. This is because any task can be interrupted in favor of a higher priority task. In such a scenario, consumer input is a high priority task and can be given more computing resources.

In an asynchronous download system, new threads are initiated to track, decompress and render the data packets from each incoming file. As each thread receives a piece of the asynchronous file, it builds a copy of the original file from all the packets. While this method has advantages over synchronously downloading images, the overhead created by spawning so many extra threads on the consumer's computer leads to unnecessary overhead, thereby slowing down the system. Thus, this method of asynchronously downloading images and spawning an individual thread to decompress and render each transmitted file has several drawbacks.

It is thus an object of the present invention to provide a system whereby files such as images, sounds and video can be transmitted across a wide area network without the problems associated with the prior art methods of synchronously downloading and spawning individual threads for each downloaded file.

SUMMARY OF THE INVENTION

The present invention is a system and method for downloading and efficiently decompressing files across a wide area network such as the Internet using minimal computer resources on the consumer's computer. To carry out its task, the system of the present invention uses, at minimum, two threads. The first thread, known as the binding thread, manages communication across the Internet between the consumer's computer and a server computer. For example, the binding thread manages TCP/IP packet transmissions between the consumer's computer and an Internet server. It should be noted, however, that several threads could act to connect a consumer's computer with a server computer.

The second thread, known as the worker thread, manages the processes of decoding and decompressing specific files for the consumer's display. No matter how many compressed files are being downloaded simultaneously from the server computer, only a single worker thread remains active. The worker thread manages decompressing files such as images, sounds and videos. As discussed above, most non-text files such as images, sounds and the like are compressed and encoded so that they can be efficiently transported across wide area networks such as the Internet. Thus, it is necessary for the system of the present invention to convert the compressed files back to their original, uncompressed form.

In the preferred embodiment of the present invention, a consumer runs browsing software to select an Internet page to be viewed. As is known, Internet browsers such as the Internet Explorer® from Microsoft® Corporation can be directed to particular sites on the Internet by entering a Universal Resource Locator (URL) to the browser to identify the site of interest. The browser will then resolve the targeted address on the Internet.

Once the browser software accesses the targeted Internet site, the binding thread on the consumer's computer begins receiving the designated HyperText Markup Language (HTML) document. The consumer's computer, in conjunction with the browser, parses the HTML document to the consumer's display. During the parsing process, if the browser software determines that a compressed file such as an image is to be displayed, the downloading and rendering process is initiated.

As a first step in the downloading and rendering process of the present invention, the binding thread instantiates a rendering object which, as described below, has the ability to paint a bitmap image on demand to the consumer's computer display. If a single worker thread has not yet been initialized, the binding thread starts a new worker thread on the consumer's computer. As discussed below, a single binding thread handles the download for each compressed file while a single worker thread manages decompressing multiple compressed files from each of the active binding threads to the consumer's computer display.

Once a worker thread has been initialized and a particular compressed file identified for download, a data buffer object is instantiated on the consumer's computer by commands from the binding thread. The data buffer object includes memory which receives and temporarily stores the incoming stream of asynchronous compressed data so that it can be processed at a later time. After commands within the binding thread have instantiated a data buffer object, the data buffer object is handed the address (or moniker) of the compressed file to be downloaded and decompressed. The data buffer object then provides an interface to the designated address to begin asynchronously downloading data into the data buffer object memory.

As the first block of data arrives from the downloading compressed file, its MIME type is determined by the buffer object. As is known, the MIME type of a file relates to the structure of the incoming file. A MIME type can be used to determine the type of decompression algorithm to run to decompress the file. For example, certain MIME types are GIF, JPEG, and the like.

Once the MIME type of the file is determined, the binding thread runs commands that instantiate an appropriate decoder object to decode the downloading file. The binding thread selects a decompressor by using a table to match the MIME type of the downloading file with the corresponding decompressor. The decoder object then acts within the context of the worker thread to retrieve the buffered data from the memory of the buffer object and decode it to a bitmap file. As discussed above, most non-text files such as images are compressed and encoded using a particular algorithm so that they can be efficiently transported across wide area networks such as the Internet. Thus, the decoder object is necessary to convert the compressed file back to its original format.

Because each type of compressed file requires its own decoding algorithm, a specific decoder object must be instantiated to decode the particular type of incoming file and store any temporary information that is generated. Accordingly, many different types of decoders are available for decoding data from the buffer object's memory. For example, a compressed file such as a JPEG image would be decoded with a JPEG decoder object. The present invention includes many other types of decoder objects such as those that read JPEG and GIF type files.

As the decoder object decodes compressed images from the buffer object's memory to a bitmap file, the rendering object that was instantiated previously by the binding thread begins to simultaneously read the bitmap file. While the rendering object reads image data from the bitmap file, it simultaneously begins requests for rendering the compressed file to the consumer's computer.

As multiple compressed files are asynchronously sent to the consumer's computer from an Internet server, a single worker thread coordinates decoding and rendering each compressed file to the display. Thus, the decoding and rendering functions of the worker thread are separated from the communication functions provided by the binding thread. This two-threaded approach provides speed and efficiency advantages over prior systems which only utilized a single thread for downloading, decoding and rendering compressed files.

In addition, the system of the present invention is more efficient than prior systems which required a new thread to be initialized for every compressed file downloaded from an Internet server to a consumer's computer. As discussed above, some prior systems asynchronously download files using a first thread, and then spawned new threads to decode and render every downloaded file. Therefore, many threads were initialized to decode and render all the different image files that might have been present, in a single, complicated document.

For example, one HTML Internet page may have five image files embedded within a single page. As the Internet browser parses an HTML document, each image that is to be rendered in the page is asynchronously downloaded from the Internet server to the consumer's computer. In prior systems, a complicated page might have spawned six or more new threads within the consumer's computer. Because each thread required system resources, the performance of the consumer's computer in prior systems degraded with each new thread. Though the actual amount of memory and CPU resources varies from operating system to operation system. The net result is sluggish performance such that no task performs adequately. The system suffers poor response time to the user's commands.

The system of the present invention, in contrast, avoids the pitfalls of prior systems by allowing asynchronous downloads of compressed files in an environment by utilizing only a single thread to decompress all of the incoming compressed files. In the present invention, only two threads can manage downloading a multitude of compressed files. A single binding thread can instantiate a buffer and rendering object for each downloading file, while a multitude of decoder objects can be decompressing image data from the buffer objects within the context of a single worker thread. The rendering object thereafter renders the downloaded file to the consumer's display. However, it should be noted that more than one binding thread may be spawned to manage asynchronously downloading the image files from the Internet server to the consumer's computer.

Decompression is a computationally intensive activity. By containing all decompression activity into a single thread, the system has the ability to temporarily suspend such activity in favor of more urgent needs. In addition, the use of a single worker thread for decompression activities minimizes the use of the resources that the computer's operation system uses to provide preemptive multithreading. Thus, the system of the present invention provides a balanced usage of all computer resources and a more efficient mechanism for rendering images and other compressed files to the consumer's computer.

DETAILED DESCRIPTION OF THE PREFERRED EMBODIMENT

Figure 1:
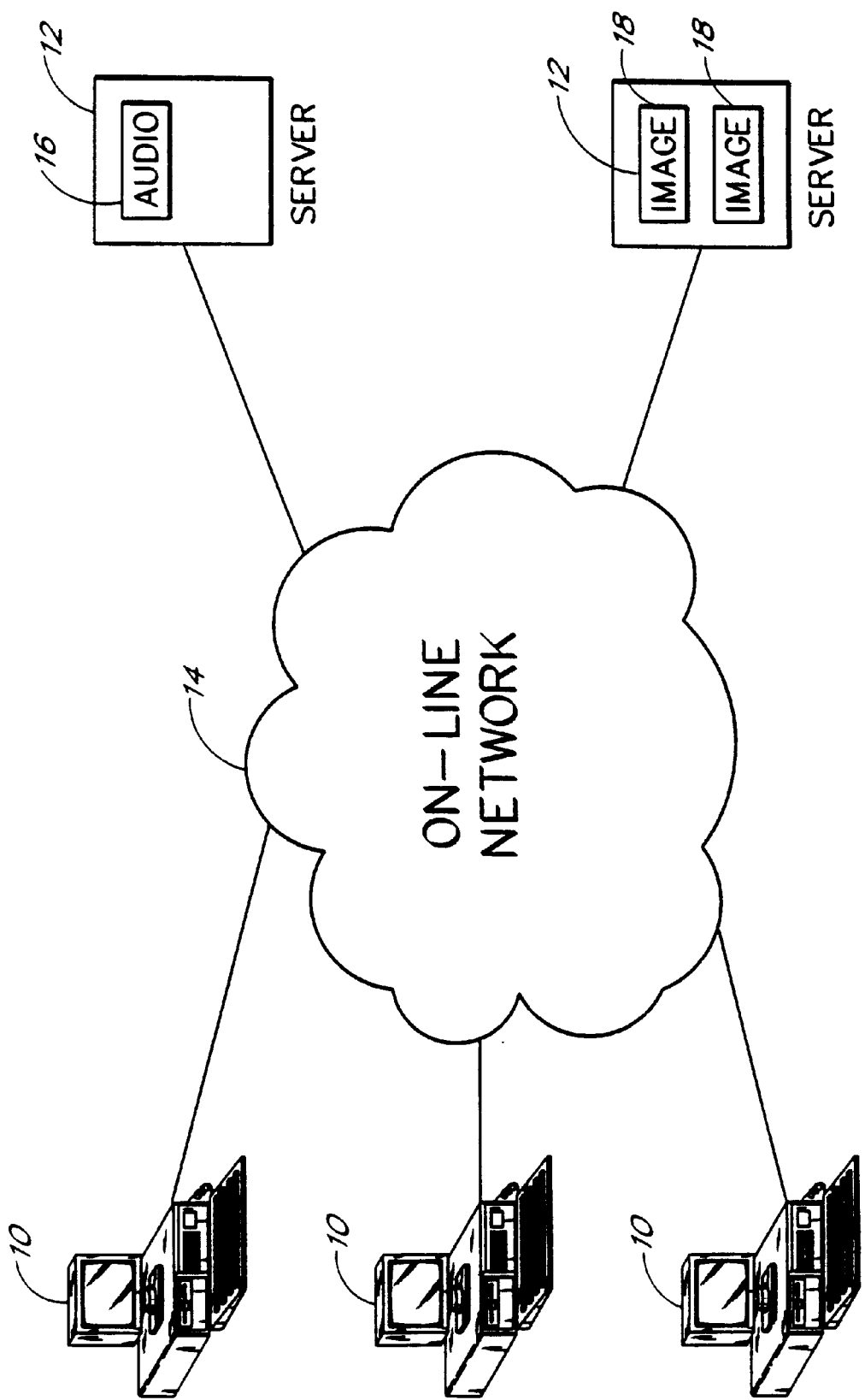
FIG. 1 is a block diagram illustrating consumer's computers linked to server computers through an on-line, wide area network.

The present invention is a system and method for downloading and decompressing compressed files such as images across a wide area network. In a preferred embodiment, compressed images are sent from a server computer to a consumer's computer. The process of receiving and rendering the compressed image is managed by a Microsoft Windows thread, termed herein as the "binding thread". Once the images are sent to the consumer's computer, they are decoded under the control of a second Microsoft Windows thread termed herein a "worker thread".

By using only two threads to control the entire download and decode process, the system of the present invention provides several efficiency advantages over prior systems. Although the present invention is described herein with reference to a preferred image download system, the invention is not so limited and can be used in a variety of other contexts in which it is desirable to provide a process for rapidly decoding and rendering images.

To facilitate a complete understanding of the invention, the remainder of the detailed description is arranged within the following sections and subsections:

I. Glossary of Terms and Acronyms
II. Overview of the Image Download System
III. Components of the Image Download ZSystem
   A. The Buffer Object
   B. The Decoder Object
   C. The Rendering Object
   D. Synchronization
   E. The Worker Thread
IV. Downloading and Decoding Compressed Files
V. Other Embodiments
VI. Interfaces
VII. Conclusion

I. Glossary of Terms and Acronyms

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web, the client is typically a "Web browser" which runs on a user's computer; the program which responds to Web browser requests at a website is commonly referred to as a "Web server."

Internet. A collection of interconnected (public and private) networks that are linked together by a set of standard protocols to form a distributed network. While this term is intended to refer to what is now commonly known as the Internet, it is also intended to encompass variations which may be made in the future, including changes and additions to existing standard protocols.

HyperText Markup Language (HTML). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyper-links"). For more information on HTML, see Ian S. Graham, *The HTML Source Book*, John Wiley and Sons, Inc., 1995 (ISBN 0471-11894-4).

HyperText Transport Protocol (HTTP). The standard World Wide Web client-server protocol used for the exchange of information (such as HTML documents, and client requests for such documents) between a Web browser and a Web server. HTTP includes a number of different types of messages which can be sent from the client to the server to request different types of server actions. For example, a "GET" message, which has the format GET <URL>, causes the server to return the document or file located at the specified Universal Resource Locator (URL).

Transmission Control Protocol/Internet Protocol (TCP/IP). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, *Internetworking with TCP/IP*, Prentice Hall, Inc., ISBNs 0-13-468505-9 (vol. 1), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename: The port specification is optional, and if none is entered by the user, the Web browser defaults to the standard port for whatever service is specified as the protocol. For example, if HTTP is specified as the protocol, the Web browser will use the HTTP default port.

World Wide Web ("Web"). Used herein to refer generally to both (1) a distributed collection of interlinked, user-viewable hypertext -documents (commonly referred to as "Web documents" or "electronic pages" or "home pages") that are accessible via the Internet, and (2) the client and server software components which provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "Web" and "World Wide Web" are intended to encompass future markup languages and transport protocols which may be used in place of or in addition to the HTML.

II. Overview of the Preferred Image Download System

This section provides an overview of an image download system in a preferred embodiment of the present invention. A block diagram of one embodiment of an on-line network is shown in FIG. 1. The image download system of the present invention includes consumer's computers 10 which are linked to server computers 12 through an on-line global wide area network 14. The server computers 12 are preferably Internet servers, and the on-line network 14 is preferably a part of the Internet computer system. As shown, the server computers 12 can include compressed audio 16 or image 18 files which are transmitted to the on-line network 14 and thereafter communicated to the consumer's computers 10.

In practice, a consumer's computer 10 requests an image 18 by accessing the server computer 12 through the on-line global wide area network 14. Normally, the consumer's computer 10 will be running a type of browsing software such the Internet Explorer® from Microsoft® Corporation. The image 18 is then transmitted through the on-line global wide area network 14 to the consumer's computer 10. The system of the present invention manages downloading the image 18 from the server computer 12 to the consumer's computer 10 and thereafter decoding and rendering the image 18 to the display of the consumer's computer 10. As used herein, decoding can also include decompressing the downloaded file into its original form.

Figure 2:
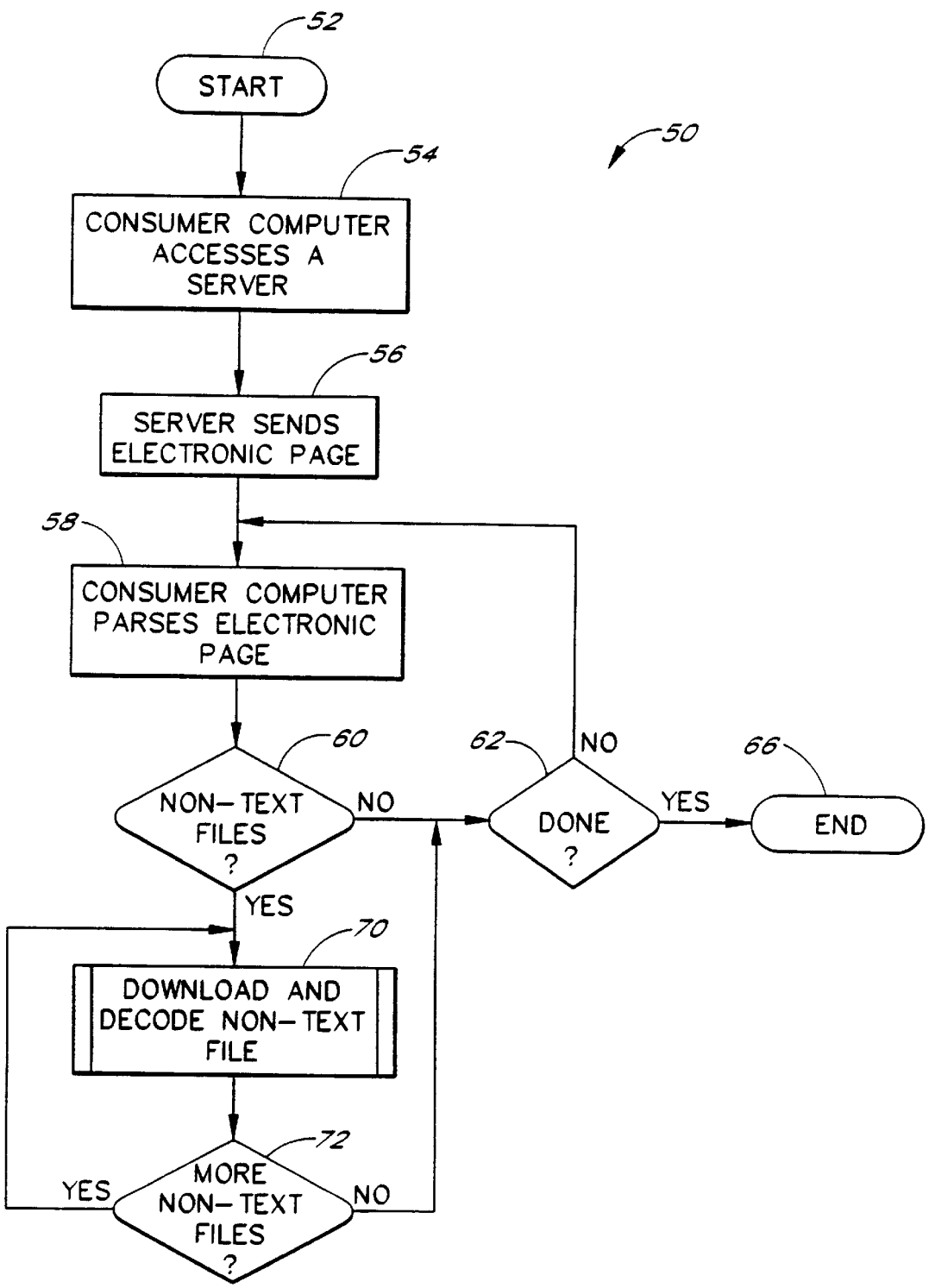
FIG. 2 is a flow diagram illustrating the present invention process of accessing a server computer and downloading and decoding compressed files.

Referring now to FIG. 2, an overview of the process of downloading and decoding compressed files, such as images and audio, is described. The downloading process 50 begins at a start state 52 and moves to state 54 wherein the consumer's computer 10 accesses a desired document located on a server computer 12. As will be described in more detail below, the consumer's computer 10 accesses the particular server computers 12 by connecting through a service provider. As used herein, the Internet is one type of on-line global wide area network. Accessing the Internet and Internet servers through an Internet Service Provider is well known in the art.

During state 54, the consumer's computer 10 utilizes a binding thread which handles TCP/IP communication between the consumer's computer 10 and the server computer 12. The program utilizing such a binding thread is preferably a Microsoft Windows 95® or Microsoft Windows NT® communication Application Program utilizing Microsoft Win32 Application Program Interface's (API's). For example, the Microsoft Windows 95 URL Moniker API is one example of a communication API. More information on these API's can be found on the Internet at *httP://www.microsoft.com/msdn/sdk/platforms/doc/activex/src/if_f2n_158.htm* or by searching the Microsoft Internet site (http://www.microsoft.com) for the term "URL Moniker". One current document is entitled *IMoniker—URL Moniker Implementation*.

Once the consumer's computer 10 has accessed a particular server computer 12 at state 54, the downloading process 50 moves to state 56 wherein an electronic page, such as one written in the HyperText Markup Language (HTML), is sent from the server computer 12 to the consumer's computer 10.

After the electronic page has reached the consumer's computer 10 at state 56, it is parsed at state 58 by browsing software on the consumer's computer 10. As is known, an Internet browser reads HTML text and sends some text to the consumer's display, while also translating codes to perform a particular function within the consumer's computer. For example, the electronic page may contain embedded codes instructing the browser to insert and display a compressed file such as an image 18 into the page.

As the browsing software reads the electronic page at state 58, a query is made whether any compressed, non-text files need to be downloaded at a decision state 60. If the downloading process 50 does not need to download any non-text files at decision state 60, a query is made whether the process 50 is done at a decision state 62. If the downloading process 50 is not done parsing the electronic page at decision state 62, the downloading process 50 returns to continue parsing the electronic page at state 58.

However, if the downloading process 50 did not need to download any compressed, non-text files to read at decision state 60, and there is no more HTML text to read at decision state 62, then the downloading process 50 ends at an end state 66. Alternatively, if the downloading process 50 did need to download a compressed, non-text file at decision state 60, then the downloading process 50 moves to a process 70 wherein the compressed, non-text file is downloaded and decoded from the server computer 12 to the consumer's computer 10. The process 70 of downloading and decoding compressed files will be described more specifically below in relation to FIGS. 5–7.

Once the process 70 has begun downloading and decoding the first file, a query is made at decision state 72 whether more non-text files exist that need to be downloaded and decoded. If more non-text files do exist at decision state 72, then the downloading process 50 returns to download and decode the remaining files at process 70. However, if no more compressed, non-text files are available for downloading at decision state 72, then the downloading process 50 queries whether it is done at decision state 62. If the downloading process 50 is done at decision state 62, then it ends at end state 66. However, if the process 50 is not done at state 62, then the process 50 continues reading the remainder of the HTML text at state 58.

Now that an overview of the download and decoding process 50 has been provided, the following section describes the objects and threads responsible for managing this system.

III. Objects within the Preferred Image Download System

Figure 3:
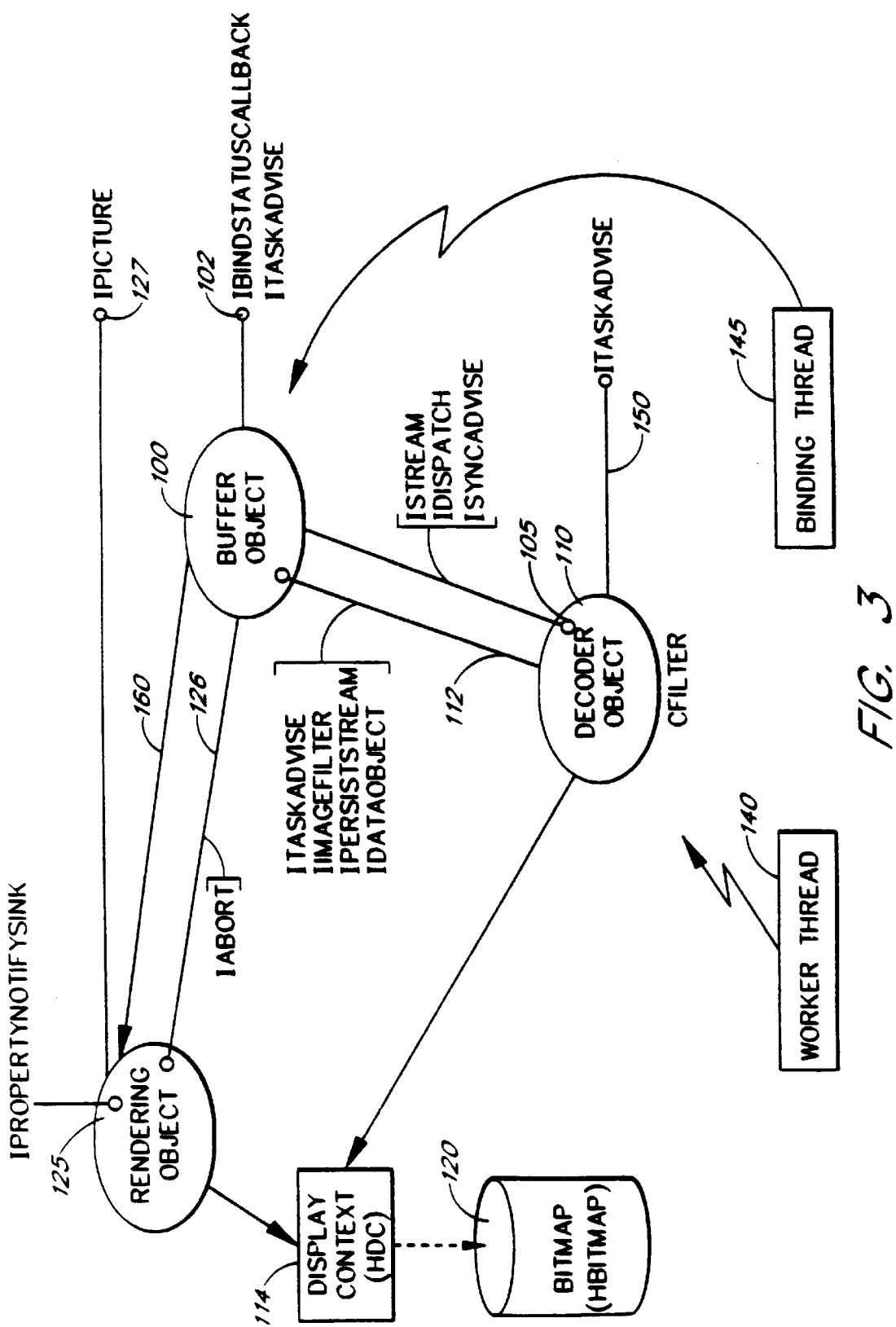
FIG. 3 is a block diagram illustrating the interaction between a rendering object, buffer object and decoder object in the system of the present invention. Connections with an open circle at the end are interfaces where the pointer determines the lifetime of the object. Connections with an arrow at the end are interfaces where the pointer does not determine the lifetime of the object.
Figure 4:
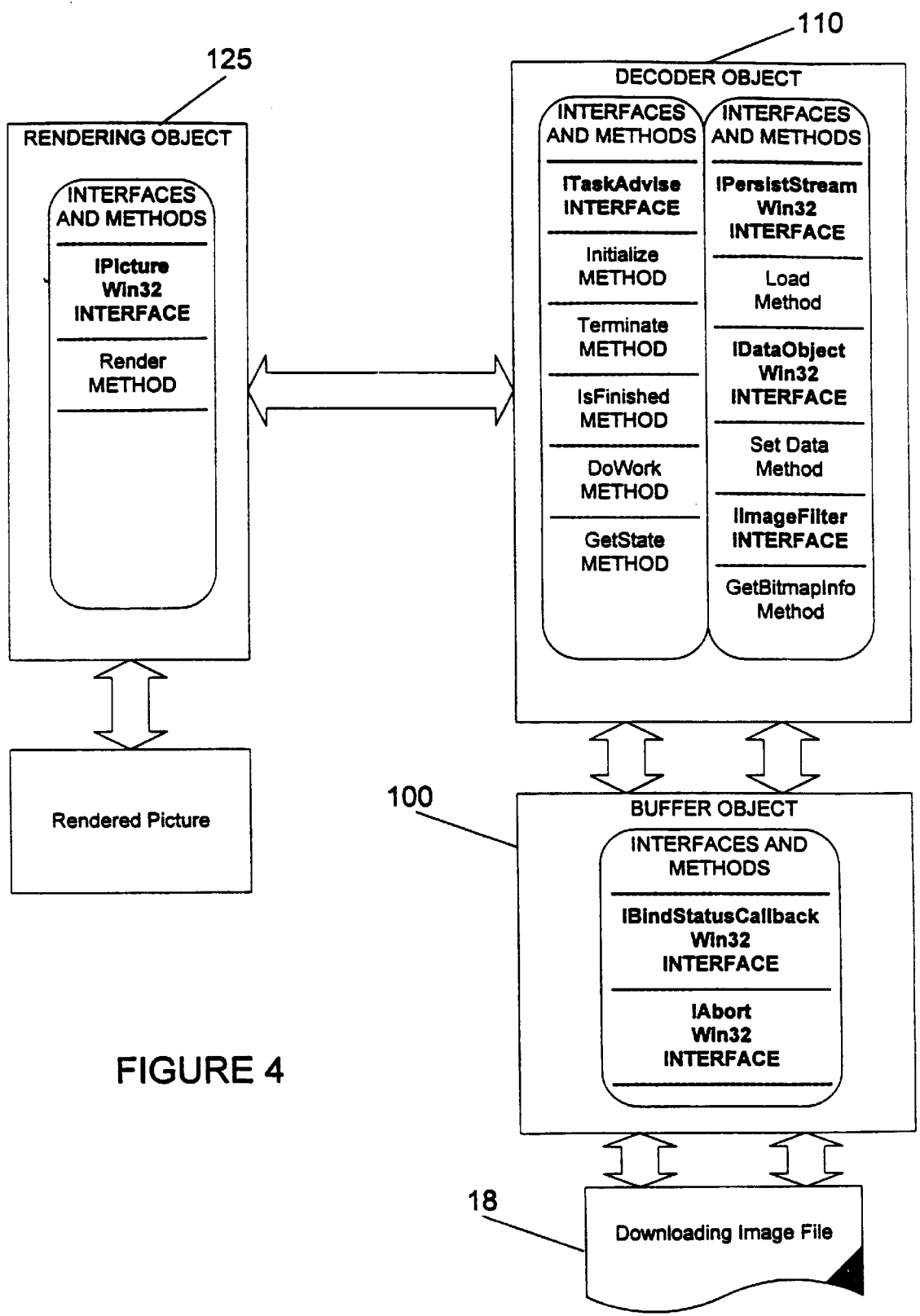
FIG. 4 is a block diagram illustrating the interfaces and methods used by the rendering object, decoder object and buffer object.

Referring to FIGS. 3 and 4, an overview of the modules and threads involved in the download and decoding system of the present invention is provided. As used herein, modules include objects and other programming components known to those of skill in the art. In this diagram, each object and its interface to other objects is shown. These objects are Microsoft OLE 2.0 objects. Additional information on Microsoft OLE objects can be found in *Inside OLE* 2 by Kraig Brockscmidt (Microsoft Press).

As soon as the request to download data from the given URL is specified, the binding thread instantiates a rendering object 125 and a buffer object 100 as shown in FIG. 3. The rendering object provides an interface 127 to the calling program so that the decompressed file can be rendered. The buffer object 100 is instantiated by the rendering object in the context of the binding thread. The buffer object 100 thereafter provides an interface called IBindStatusCallBack 102 to the program requesting to download and decode a compressed file. In this example, the compressed file is an image file to be rendered. Normally, the calling program is the Browser software used to access particular sites on the Worldwide Web. Once the IBindStatusCallBack interface 102 is established with the image file 18 to be downloaded, data can be sent to a memory within the buffer object 100.

As data begins filling the buffer object's memory, there comes a time, usually within 10 to 15 bytes of downloaded data, that the buffer object 100 can determine what type of algorithm will be needed to decode the particular type of compressed file being downloaded. This determination is normally based on the MIME type of the received data, and the data contents of the first incoming data packets. A decoder object is then instantiated in the context of the binding thread 145, that is running on the consumer's computer. By analyzing the MIME type of the downloading compressed file, the binding thread determines the appropriate type of decoder object 110 to instantiate. Each decoder object includes built-in routines for decompressing the particular type of file in the memory of the buffer object 100. The worker thread receives messages when a buffer object contains buffered data to be decoded and causes the corresponding decompression code to be executed in the decoder. For example, a specialized GIF decoder object will be instantiated to decode a downloading GIF-type image. This decoder will receive processing time for decoding in the context of the worker thread. As can be imagined, this system has the flexibility to employ many different types of decoder objects, each of which can decode a particular type of compressed file.

After image data is decoded by the decoder object 110, it is sent through a display context 114 to a bitmap file 120. The display context 114 is a Microsoft Windows object, which matches the file to be displayed on the consumer's computer with computer's video hardware. For example, a display context 114 may include custom colors to be used with the bitmap file 120. More information on display contexts can be found in *Programming Windows* 95 (Charles Petzold, Microsoft Press).

As the decoder object 110 is writing the bitmap file 120 through the display context 114, the rendering object 125 may be required to show the available file through interface 127 called IPicture. The IPicture interface 127 is exposed to the part of the program which originally requested the image. The IPicture interface 127 is the outside program's link to the download and decompression activity. The IPicture interface 127 is used by the calling program to paint the available portion of the requested image to the consumer computer's display on demand. The rendering object 125 also maintains communication with the buffer object 100 though the buffer object's IAbort interface 126.

Because the decoder object 110 and rendering object 125 are simultaneously reading and writing to the bitmap file 120 through the display context 114, a synchronization system is provided between these objects. It would be undesirable to have the decoder object 110 write to the bitmap file 120 at the same time the rendering object 125 is reading from the same portion of the bitmap file 120. This would lead data integrity problems with bitmap file 120. For example, if the decoder object 110 updates the width and height of the image at the same moment that the rendering object 125 attempts to display the image the synchronization system will keep the data integrity intact so that both width and height values have been properly set. Here the danger is that the rendering object might read the width and height values before both have been properly updated by the decoder. The synchronization system is part of the buffer object's ISyncAdvise interface 105 implementation and is used to track and synchronize usage of the bitmap file 120 and display context 114.

These objects and interfaces will be described below in more detail. As also shown in FIG. 3, the worker thread 140 and binding thread 145 act upon the decoder object 110, buffer object 100 and rendering object 125. The binding thread 145 and worker thread 140 are created via Microsoft Windows® APIs and will be discussed more completely below.

The buffer object 100 is designed to have its interface member functions called primarily from within the binding thread's context. The only exceptions to this rule are the ISyncAdvise 105, and ITaskAdvise 105 interfaces implemented on the buffer object 100. The members of those two interfaces are designed so that they can be safely called from the worker thread context. Information can be safely passed between the two thread contexts without loss of integrity. The decoder object 110 is designed to have its interface member functions called from within the worker thread context. This process will be described in more detail in the following paragraphs.

A. The Buffer Object

The data buffer object 100 serves a variety of purposes in this application. Its base class is responsible for simple buffering of the compressed image data that arrives via the IBindStatusCallback interface 102 from the program that is attempting to download and render the image. The data buffer's subclass includes an awareness of the rendering object's implementation 160, and additionally implements the IAbort interface 126.

The browser program calling the IBindStatusCallback interface 102 of buffer object 100 eventually begins supplying compressed image data from the server computer 12. As a first step, the buffer object 100 reads the MIME type of the image file being sent from the server computer 12 via a MIME type tag. The buffer object 100 then uses the tag information and any available compression data to instantiate an instance of the decoder object 110 which can decompress data.

Each time data arrives at the buffer object 100, it is temporarily stored to a designated buffer memory and a message is sent to the worker thread's 140 message queue to begin decoding the buffered data. The message to the worker thread 140 contains a pointer to the buffer object's ITaskAdvise interface 105 so that when the worker thread 140 receives the message, it calls the ITaskAdvise interface 105, passing NULL for the ISyncAdvise parameter of ITaskAdvise::DoWork( ). The buffer object 100 then passes its implementation of the ISyncAdvise interface 105 to the decoder object's ITaskAdvise interface 112, ITaskAdvise::DoWork( ) member.

This operation accesses no data on the buffer object 100 except for the decoder object 110, whose interface members are designed to be executed from within the worker thread context. Thus, the DoWork( ) call on the buffer object 100 is just forwarded to a DoWork( ) call on the decoder object 110. The buffer object's ISyncAdvise interface 105 is the only interface on the buffer object 100 that requires any special implementation so that it can be called back from the worker thread context. Its operation is described in section: D. Synchronization, below.

The IStream interface 105 is used by the decoder object 110 to read the data stream from the buffer.

B. The Decoder Object

The decoder object 110 performs the decompression and decoding function for the downloading file. So that a message queue on the worker thread 140 can process messages from the widest variety of iterative decoder objects, the interfaces illustrated in Section VI below are defined to facilitate generic communication between the decoder object 110 and it's iterative multi-tasking environment. As discussed above, the decoder object 110 functions to decode compressed file data that is streamed into the memory of the buffer object 100 from a downloading image file.

The decoder objects are instantiated by the buffer object 100 in the binding thread context once enough data has been received to determine the decoder type required to decompress the data. The appropriate decoder type is instantiated according to the MIME type of the downloading compressed file. As can be imagined, several decoder objects can act upon their corresponding buffer objects simultaneously. However all of the decoder objects act within a single worker thread context. Thus, when many files are being decoded simultaneously, only a single worker thread is operating to manage all of the decoder objects.

The decoder object's 110 implementation of IPersistStream interface 112 is used to assign a pointer to the buffer object's 100 IStream interface 105. These interfaces are described in *Inside OLE* 2 by Kraig Brockscmidt (Microsoft Press).

C. The Rendering Object

The rendering object 125 represents the OLE2 standard picture object. The rendering object 125 is created in the binding context to render imagery to the consumer's display. The code that creates the rendering object 125 checks if a worker thread 140 has been setup. If not, it initializes a worker thread 140 then it proceeds to create a buffer object 100 and initializes it with a Universal Resource Locator (URL). The buffer object 100 provides the URL and its IBindStatusCallback interface 102 to yet another object (a Microsoft® Asynchronous Moniker) optionally supplied by the Browser that actually retrieves the data.

The buffer object 100 implements an IAbort interface 126 for use by the rendering object 125. When the Browser program is finished with the rendering object 125 (eg. it is fully rendered to the display or the consumer selects another HTML page), it is released via the IPicture::Release( ) member (which is available on all Windows ® OLE2 object interfaces). When the reference count of the rendering object 125 falls to zero, the C++ destructor of the rendering object 125 calls the buffer object's IBinding::Abort( ) method thus releasing all buffer interfaces it holds. The IBinding::Abort( ) method will abort a image download if incomplete at the time of the call. The buffer object 110 then calls the ITaskAdvise::Terminate( ) method existing on the decoder object 110. The decoder object 110 then releases the IStream 105 and any other interface it may have acquired from the buffer object 110.

After the above steps, the buffer object 110 releases all decoder object interfaces and the decoder object 110 will then destroy itself. When the rendering object 125 releases it's last reference to the buffer object 100, after calling IBinding::Abort( ), then the buffer object 100 destroys itself. After all these steps have occurred, then the rendering object 125 will complete execution of its destructor and destroy itself. Additional information about reference counting Microsoft OLE2 objects can be found in *Inside OLE* 2 by Kraig Brockscmidt (Microsoft Press).

D. Synchronization

Since during a download, the decoder object 110 may be asked to suspend processing to wait for more data, it is advantageous for the decoder object 110 to process data in segments, retaining state data so that upon the next DoWork( ) call, the decoder object 110 may proceed from where it left off. Data processed and decompressed by the decoder object 110 during the DoWork( ) calls drive the state machine in the decoder object 110.

The buffer object 100 that is feeding data to the decoder object 110 can determine the state the of the decoder object 110 by calling its ITaskAdvise::GetState( ) method. However, this information itself may not be useful to the decoder object 110.

Occasionally the decoder object 110 may require data other than the information that is coming from the data stream from the buffer object 100 to continue processing. Used in conjunction with the ITaskAdvise interface 150, state data from the ISyncAdvise interface 105 can be very useful. As discussed above, a single instance of an ISyncAdvise implementation is paired with each instance of a decoder object 110. The implementing site, the buffer object 100 in our case, is notified of the decoder object's state changes through the ISyncAdvise::OnNextState( ) method.

The correct states that a decoder object 110 may be in, are defined here as 'C' string constants:

define ITASTR_DCWAIT (TEXT( "MS_AsyncImage_DCWait" ))
define ITASTR_DISPLAY (TEXT( "MS_AsyncImage_Display" ))
define ITASTR_ABNORMAL (TEXT( "MS_AsyncImage_Abnormal" ))

```
#define ITASTR_FINISHED (TEXT( "MS_syncImage_
    Finished" ))
```
Upon initialization of the system, the code responsible for the buffer object 100 and decoder object 110 each register the above string constants with the Microsoft Windows system by implementing the following Microsoft Win32 API call:

ATOM GlobalAddAtom( LPCTSTR lpStringToAdd );

This function checks if the string has already been assigned a 16 bit integer ATOM. If so, that same ATOM is returned. If not, a new ATOM value is created by the system and returned. This function is called 4 times, once for each string.

For example, both the buffer object's initialization code and the decoder object's initialization code (see Win32 DllMain( )—DLL_PROCESS_ATTACH message) call GlobalAddAtom( ITASTR_DCWAIT ). The first call that succeeds will register the string constant as an 16 bit integer ATOM. The second call to GlobalAddAtom( ITASTR_DCWAIT ) returns the same ATOM value created from the first call. In this manner both objects can refer to the state via the same constant. Use of ATOM's obviates the need for lengthy string comparisons when the buffer object 100 gets signaled that the decoder object 110 is in a new state.

As the decoder object 110 changes state it returns these ATOM values to the caller of ITaskAdvise::DoWork( ) via the parameter supplying the ISyncAdvise::OnChange State( ) member. The states of the decoder object 110 are defined below in Table 1.

TABLE 1

Decoder Object States

| State | Description |
|---|---|
| ITASTR_DCWAIT | The decoder object has decompressed enough information from the stream and needs an HDC and HBITMAP (bitmap file) to continue. This state is necessary since the HBITMAP cannot be created until the image dimensions and color information has been decoded from the buffer stream. The caller can retrieve the dimension and color information by using the IImageFilter interface on the decoder object. |
| ITASTR_DISPLAY | Enough of the image has been decompressed so that the rendering object may display the currently decompressed portion of the image. |
| ITASTR_ABNORMAL | There was an error in decompression and the decoder object cannot continue decompressing the stream of data from the buffer object. |
| ITASTR_FINISHED | The buffer data has been completely decompressed by the decoder object. From this point on, the rendering object can display the entire image. |

For example, the bitmap file 120 is not created until enough of the compressed data has arrived and been decompressed so that the decoder object 110 can determine the necessary characteristics needed for creation of the bitmap file 120. One example of a necessary characteristic is the number of colors in the image. The decoder object 110 signals the synchronization system with a ISyncAdvise::OnNextState( ) call specifying that all information needed to create a bitmap object 120 is available. At that point, the synchronization system calls the rendering object 125, which retrieves the information from the decoder object 110 and creates the bitmap file 120.

The decoder object 110 may optionally supply a return ISyncAdvise implementation of it's own to pass to the OnNextState( ) method when it calls back. If processing within OnNextState( ) might be lengthy, the decoder object 110 can signal back to the caller to suspend its processing. The decoder object 110 may pass NULL for that parameter whenever it calls OnNextState( ) on the callback ISyncAdvise. The following is a simple pseudo code example of this process.

Note: g_<name> is a global variable. p_<name> is a parameter. l_<name> is a local variable.

```
SCODE CImageFilter::DoWork(
    BOOL              p_fIdle,
    LPSYNCADVISE      p_psyncSite
){
    if( NULL == p_psyncSite )
        return( E_INVALIDARG );
    SCODE l_scReturn;
    do {
        l_scReturn = GetMore( p_psyncSite ); // Process a block
        p_psyncSite->OnNextState( m_atomState,
                    FALSE, NULL ); // Report back
    } while( ( l_scReturn == S_OK ) &&
            ( p_psyncSite->OnContinue( NULL ) == S_OK ) );
    return( S_OK );
}
```

In the above example, CImageFilter is an implementation of a decoder object 110. The decoder object's ITaskAdvise::DoWork( ) function, after making a simple check on it's parameter's, remains in a "do while" loop as it decompresses data from the buffer object 100. When the decoder object 110 needs to perform a state transition, it exits the GetMore( ) function and reports back to the buffer object 100 its new state, returning an ATOM value, via the ISyncAdvise::OnNextState( ) member of the p_psyncSite callback given as a parameter from the DoWork( ) function's caller. In this example, the internal variable m_atomState reflects the state of the decoder.

At any time, the decoder object 110 may drop out of the "do while" loop and return from the DoWork( ) call. The following are three major reasons why the decoder object 110 would leave the "do while" loop:

1) All of the available data from the buffer object has been read but the decoder is expecting more data to arrive at a later time. Processing for this particular decoder object halts until more data becomes available, because the GetMore( ) Function would return E_PENDING.
2) The caller wishes to perform work elsewhere and so returns S_FALSE from decoder's p_psyncSite->OnContinue(NULL) call. The decoder object will therefore stop processing data from its buffer and return control to the caller.
3) The decoder object 110 has encountered an unrecoverable error and can no longer continue. This is signaled by passing the ATOM ITASTR_ABNORMAL as the parameter to p_psyncSite->OnNextState( ).
4) The decoder object 110 has successfully decompressed the entire file. This is signaled by passing the ATOM ITASTR_FINISHED as the parameter to the to p_psyncSite->OnNextState( ).

A decoder object 110 proceeds through the following states during its lifetime: While processing data from the buffer object 100 it returns NULL (0) for the OnNext State( ) ATOM parameter. When the decoder object 110 has enough data to construct a Microsoft Windows BITMAPINFO-HEADER structure and a color table, it signals from the worker thread 140 that it is ready to begin handing data to the rendering process with the ITASTR_DCWAIT ATOM.

The implementer of the p_psyncSite object responds to the OnNextState( ) call by calling the decoder object IImageFilter interface 112 IImageFilter::GetBitmapInfo( ) member on the decoder to retrieve the BITMAPINFO-HEADER and color table. The caller then supplies a Win32 Bitmap (HBITMAP), and a Display Context (HDC) to the decoder object 110 via an interface very similar to the IDataObject interface 112. The HBITMAP given is the best representation of the information supplied by BITMAPIN-FOHEADER and color table data. The HDC is used to apply decoded image data to the HBITMAP. More information on HBITMAP and HDC handles and their use can be found in *Programming Windows* 95 (Charles Petzold, Microsoft Press). Information on the IDataObject interface can be found in *Inside OLE* 2 by Kraig Brockscmidt (Microsoft Press).

Upon the return of OnNextState( ), the decoder object 110 attempts to continue the next iteration within the "do while" loop. If the HBITMAP is suitable, the decoder object 110 begins decompressing the image bits resulting in an image for the rendering object 125 to display. As portions are decompressed, the decoder object 110 periodically advises the caller that it may display the newly decompressed pieces by returning from the GetMore( ) call and supplying the ITASTR_DISPLAY ATOM via m_atomState to OnNextState( ).

Finally, when the decoder object 110 has completed decompressing, it supplies the ITRASTR_FINISHED ATOM and drops out of the "do while" loop. Further calls to DoWork( ) will not result in any more processing.

E. The Worker Thread

As discussed above, the thread initiating the data download process is referred to as the binding thread 145, whereas the thread that manages the decompression and advises the rendering process is known as the worker thread 140. Synchronizing messages from the worker thread 140 to the binding thread 145 is an issue that should be considered in relation to this system.

Many messages are sent from the binding thread 145 to the worker thread 140 to maintain system integrity. Messages such as the currently decompressed image region must be periodically sent back from the decoder object in the worker thread 140 context to the rendering object 125 in the binding thread 145 context. In addition, the caller that began the binding most likely is NOT thread safe. Finally while there is only one worker thread in this preferred implementation, the browser can potentially request image downloads from different binding thread contexts. This means that the code executing in the worker thread context needs to be aware of the proper binding thread context to return messages to on a image by image basis. For example the user may open a new window in the Microsoft Internet Explorer 3.0 browser. Each new window executes in a different bind context than the last. The code executed in the worker thread context must take steps to return synchronization messages to the correct binding thread.

Thread safety refers to accessing an object's data from more than one thread context. One way of ensuring thread safety is to block access of an object's data structures with one or more semaphores. The semaphore signals when it is safe for a thread to continue execution through a critical section of code. While a thread is in the critical section, it signals to other threads that they may not enter by use of a semaphore. More information on thread safety is available in *Advanced Windows NT* by Jeffrey Richter (Microsoft Press). The problem with this approach is that multiple threads now must wait for each other to gain access to the critical section of code. This reduced parallel execution can adversely affect the system's performance.

One portion of the problem of thread synchronization is solved using Microsoft OLE2 Apartment Model marshaling Win32 API's. Through this mechanism, the Microsoft Operating System ensures that an OLE2 object created within a particular thread context is only called from within that same context. This context is referred to as an apartment. This relieves the developer of the object from the requirement of protecting all access to internal variables via semaphore access and shifts that burden to the operating system.

The drawback with this model is that it is relatively expensive to synchronize all of the objects with this strategy. Each is treated as a remote procedure call: as if the call comes from another process, even though all that is desired is a same process call (eg: thread to thread synchronization). For this reason, the image downloading implementation of the present invention only uses the OLE2 Apartment Model synchronizing feature to return status messages from the decoder object 110 (in the Worker thread context) to the buffer object 125 (in the binding thread 145 context). This mechanism is discussed in more detail below.

The buffer object 100 implements an IDispatch interface 105 for this marshaling since all the proper support code to marshal this interface already exists. The buffer object's 100 ISyncAdvise which it passes as the site parameter for the IThreadAdvise::DoWork( ) call to the decoder, translates ISyncAdvise::OnNextState( ) calls in the worker thread 140 context to IDispatch::Invoke( ) calls on the buffer object 100. Those calls are synchronized by the Microsoft Operating System and emerge in the binding thread 145 context to be processed. In that context, the buffer object 100 can safely forward the appropriate calls to the rendering object 125 without worrying that another thread is accessing critical data elements of the rendering object 125.

When the buffer is initially created, it marshals its IDispatch interface 105 to itself in the context of the binding thread 145 using the MS-Win32 API CoMarshalInterface( ). At this point the buffer object 100 is effectively holding a reference to itself. When a TM_DATA message is processed in the worker thread 140 context, the synchronizing IDispatch interface 105 is un-marshaled by the buffer object 100 using the MS-Win32 API: CoUnmarshallInterface( ), used once for that call and released. For each subsequent TM_DATA call, the buffer object 100 first performs the task of un-marshaling the synchronizing IDispatch 105 when ITaskAdvise 105 DoWork( ) call is to be performed, releasing the IDispatch 105 just before returning. However, the final circular reference on the buffer object 100 is released when the rendering object 125 is released and calls the buffer object 100 on its IAbort interface 126 Abort( ) member. The Abort( ) member calls the MS-Win32 API: CoReleaseMarshalData( ) thus releasing the circular reference of the buffer object 100 on itself.

The decoder object 110 is unaware of this activity since, of course, it calls back via ISyncAdvise interface 105 methods. It is the buffer object's implementation of the ISyncAdvise interface 105 that takes advantage of the IDispatch interface 105 for marshaling purposes. This IDispatch interface 105 is not used directly by any other objects. Thus, the complicated problems of thread synchronization are solved in the single implementation of the buffer object 100 versus the various decoder object 110 implementations. For example: the disparate GIF and JPEG decoder implementations do not themselves need to be marshaled nor implement any synchronization other than that implied by the usage ITaskAdvise and ISyncAdvise interfaces.

Avoiding the multiple CoMarshalInterface( )/CoUnmarshalInterface( ) calls might be desirable, but there is only appreciable delay the first time these API's are called and as such represent only a minor performance optimization.

The following code is an example of launching a new (worker) thread in the Microsoft Win32 environment.

Note: g_<name> is a global variable. p_<name> is a parameter. l_<name> is a local variable.

```
SCODE _PictThreadInit( BOOL p_fInit ) {
    if( p_fInit ) {        // If true then initialize thread
            g_hThread = CreateThread(
                NULL,
                0, // Stack size, 0 default
                (LPTHREAD_START_ROUTINE)&PictWorkerThread,
                NULL, // Argument for Worker Thread.
                0,    // Start running
                &g_dwThreadID );
        if( NULL == g_hThread )
            return( E_FAIL );
        HANDLE l_hProcess      = GetCurrentProcess( );
        DWORD dwOldPrioClass = GetPriorityClass( l_hProcess );
        // Increase the thread priority until worker thread is initialized.
        SetPriorityClass ( l_hProcess, HIGH_PRIORITY_CLASS );
        SetThreadPriority( g_hThread, THREAD_PRIORITY_HIGHEST );
        DWORD l_dwResult = WaitForSingleObject( g_hsemStartThread,
                                                                INFINITE );
        if( WAIT_OBJECT_0 != l_dwResult )
            return( E_FAIL );
        // Return worker to normal priority & close the unnecessary     // semaphore.
        CloseHandle( g_hsemStartThread );
        g_hsemStartThread = NULL;
        SetPriorityClass ( l_hProcess, dwOldPrioClass );
        SetThreadPriority( g_hThread, THREAD_PRIORITY_HIGHEST );
    } else { // If false then shut down the thread.
        if( NULL != g_hThread ) {
            CloseHandle( g_hThread );
            g_hThread   = NULL;
        }
        g_dwThreadID = 0;
    }
    return( S_OK );
} // End _PictThreadInit
SCODE _PictWorkerThread( LPVOID ) {
    // This function executes in the context of the worker thread.
    if( FAILED( CoInitialize( NULL ) ) )
        return( E_FAIL );
    // Any call to the message queue on a thread init's it for use.
    MSG l_oMsg;
    PeekMessage( &l_oMsg, NULL, 0, 0, PM_NOREMOVE );
    // Above was called so trigger semaphore to inform original launching
    // tread.
    if( !ReleaseSemaphore( g_hsemStartThread, 1, NULL ) ) {
        CoUninitialize( );
        return( E_FAIL );
    }
    // Drop into message queue and wait for work.
    while( GetMessage( &l_oMsg, NULL, 0, 0 ) == TRUE ) {
        const LPIMAGEURL & l_qustmTemp = (LPIMAGEURL)l_oMsg.lParam;
        switch( l_oMsg.message ) {
           case TM_DATA:
                l_qustmTemp->DoWork ( FALSE, NULL );
                l_qustmTemp->Release( );
            break;
            default:
                DispatchMessage( &l_oMsg );
                break;
        }
    }
    CoUninitialize( );
    return( S_OK );
} // End _PictWorkerThread
```

IV. Downloading and Decoding Compressed Files

Figure 5:
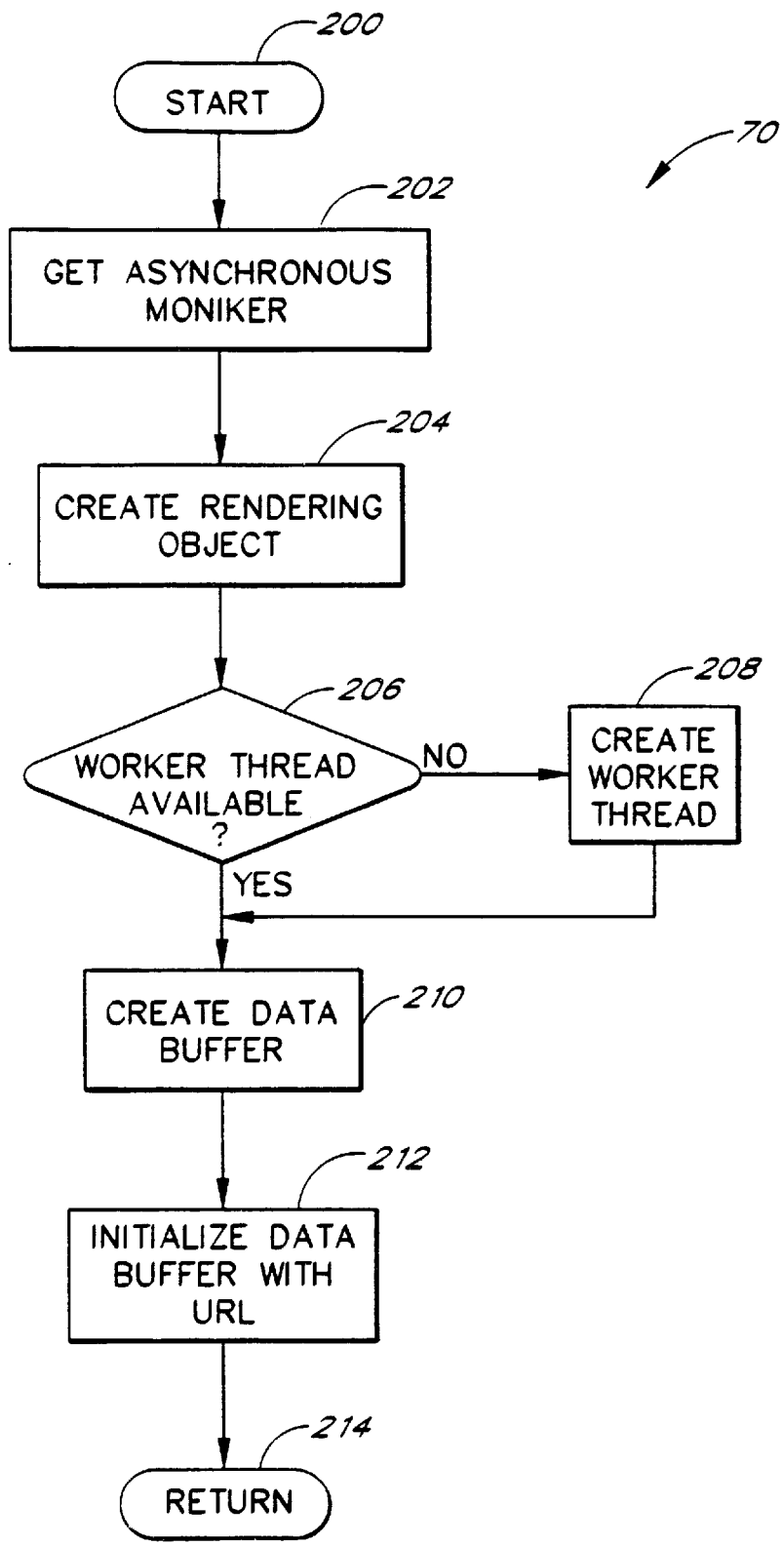
FIG. 5 is a flow diagram of the present invention process for creating and initializing a data buffer with a Universal Resource Locator (URL) which is part of the Download and Decode Non-Text File process of FIG. 2.

The process 70 of downloading and decoding compressed files from FIG. 2 is now described in more detail beginning with FIG. 5. As shown in FIG. 5, the process 70 of downloading and decoding compressed files begins at a start state 200 and then is followed by state 202 wherein the asynchronous moniker of the compressed file is retrieved.

Once the asynchronous moniker is retrieved at state 202, the rendering object 125, as shown in FIGS. 3 and 4, is created at state 204. The process of creating the rendering object 125 is controlled by the binding thread 145, once it is determined that a new compressed file will be sent from the server computer 12 to the consumer's computer 10. After the rendering object 125 has been created at state 204, a query is made at a decision state 206 whether the worker thread 140 is available.

If the worker thread 140 is not available at decision state 206, then a worker thread 140 is created at a state 208. Once the worker thread 140 has been found to be available at decision state 206 or has been created at state 208, a data buffer object is created by the binding thread 145 at a state 210. After the data buffer object has been created at state 210, it is initialized with a universal resource locator (URL)

at a state 212. Thus, the rendering object 125 and buffer object 100 for the compressed file that is to be downloaded have now been created with the process 70 as shown in FIG. 4.

The URL given to the data buffer in state 212 opens an interface between the buffer object and the compressed file to be downloaded from the server computer. There is therefore a direct connection between the buffer object 100 and the compressed file to be downloaded. Once the data buffer has been initialized with the URL of the compressed file, the process 70 returns at a state 214 to wait for more data packets to arrive at the buffer object 100.

Figure 6:
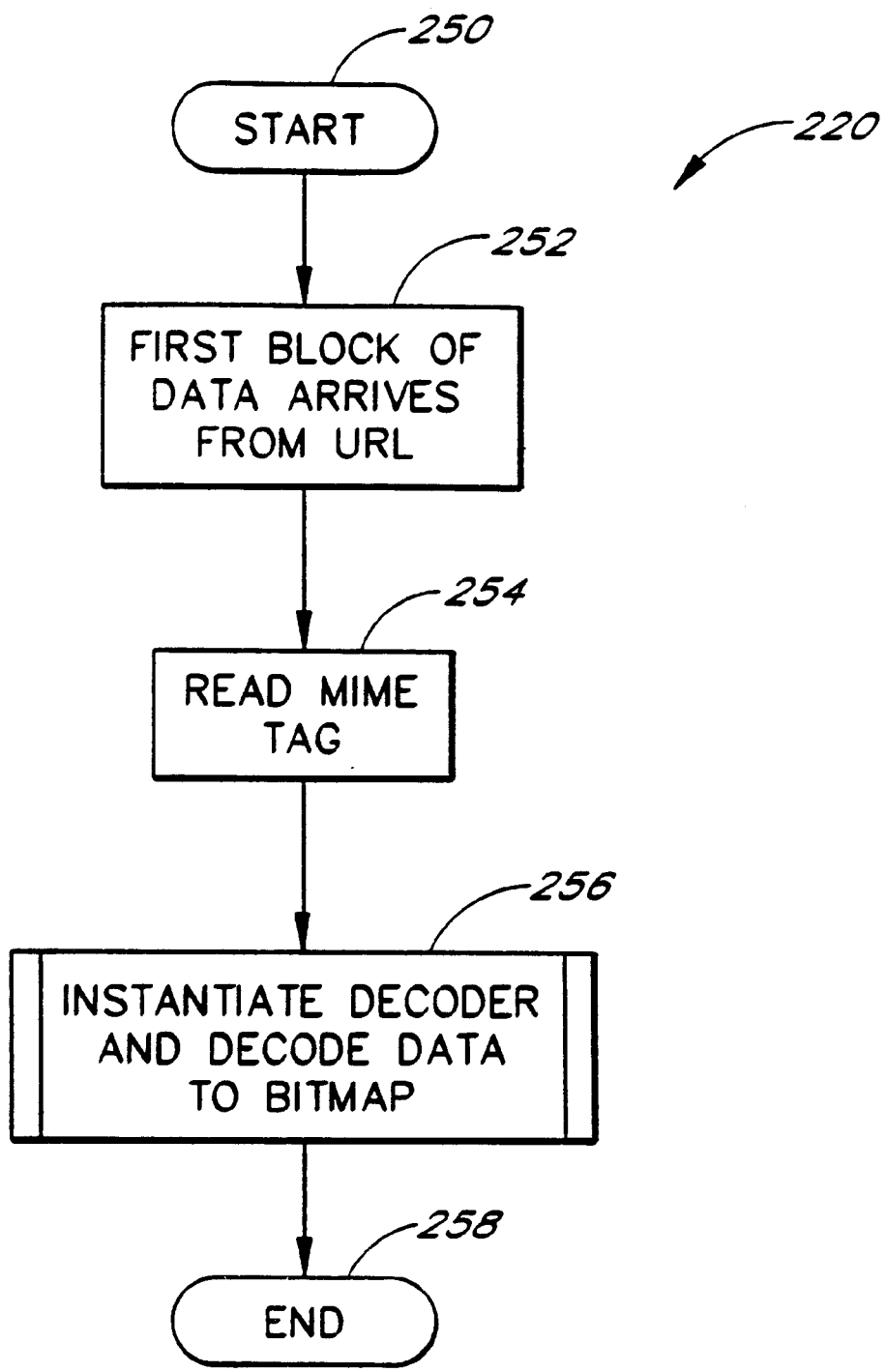
FIG. 6 is a flow diagram illustrating the process of a buffer object receiving a first block of data and thereafter decoding the data to a bitmap file as part of the Download and Decode Non-Text File process of FIG. 2.

Referring to FIG. 6, a subprocess 220 of the process of downloading and decoding compressed files is shown. While still under the control of the binding thread 145, the buffer object that was initialized with a URL at state 212 (FIG. 5) starts receiving data at a start state 250 of FIG. 6. As the first blocks of data arrive from the URL to the data buffer object at a state 252, the MIME tag of the first block of data is read by the buffer object at a state 254. As is known, the MIME tag describes the type of file being downloaded to the buffer object. For example, some MIME tags are known as JPEG, TIFF, MPEG, and many others.

These MIME tags describe the compression mechanism used to compress the size of the downloaded compressed file. By reading the MIME tag at state 254, the process 70 and subprocess 220 can determine the appropriate decoder object to instantiate to properly decode the compressed file.

Still referring to FIG. 6, once the MIME tag has been read at state 254, the process of instantiating the decoder object and decoding the incoming data to a bitmap file 120 begins at a process state 256. This process will be described in more detail below with reference to FIG. 7. Once the decoder object has been instantiated by commands within the binding thread and begins decoding data through the display context to the bitmap file 120 at process state 256, the process ends at an end state 258.

Figure 7:
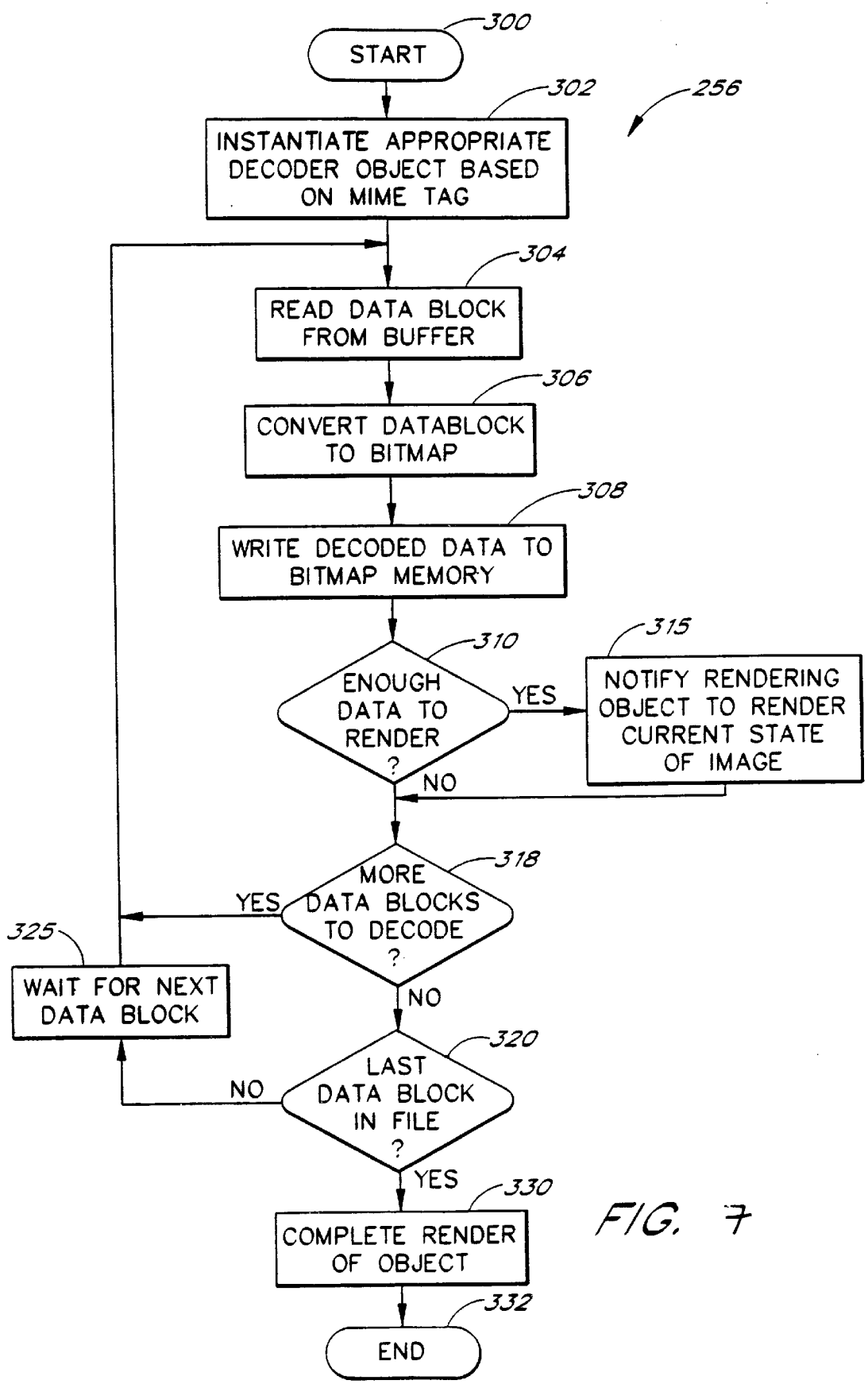
FIG. 7 is a flow diagram illustrating the Instantiate Decoder and Decode Data to Bitmap process of FIG. 5.

Referring to FIG. 7, the process state 256 of instantiating a decoder and decoding data to a bitmap file 120 is described. As shown, the INSTANTIATE DECODER process 256 begins at a start state 300 and is followed by a state 302 where the appropriate decoder object is instantiated based on the MIME tag and available data read at state 254 of FIG. 6. As discussed previously, each different type of compressed file requires a special decompression algorithm so that it can be translated into an appropriate bitmap file 120. For example, an image file 18 that has been compressed into a GIF file would need to be decoded with a decoder object designed to decompress GIF type files. Therefore, at state 302 of FIG. 7, the appropriate decoder object is instantiated after the process state 256 has analyzed the MIME tag on the downloading compressed file. Once the appropriate decoder object has been instantiated at state 302, the process state 256 begins reading data blocks from the buffer object at state 304.

Once a particular data block has been read from the buffer object at state 304, it is converted to a bitmap file 120 at state 306 using the appropriate display context from the Microsoft Windows® environment. Once the data block has been converted to a bitmap file 120 using the display context at state 306, the process state 256 writes the decoded data to a bitmap memory at state 308.

After the decoded data has been written to the bitmap memory 308, a query is made at a decision state 310 whether enough data has been written to the bitmap memory 308 so that it could be rendered to the screen. If enough data has been stored in the bitmap memory 308 to begin rendering the image to the consumer's computer display, then the process 256 notifies the rendering object to start rendering to the consumer's display at a state 315. Once the rendering object 125 has been notified to begin rendering the image file to the consumer computer's display at state 315, a query is made whether more data blocks exist that need to be decoded at a decision state 318.

If enough data was not present in the bitmap memory 308 to begin rendering at decision state 310, the process also moves to decision state 318 to determine whether more data blocks to decode exist in the buffer object. If more data blocks do exist in the buffer object at decision state 318, then the process state 256 returns to state 304 wherein the data block is read from the buffer. However, if no more data blocks are available from the buffer object at decision state 318, then the process state 256 determines whether the previous block that was rendered and decoded was the last data block in the compressed file at a decision state 320. If the previous data block was not the last data block in the file at decision state 320, then the process state 256 yields control at state 325 wherein it remains until the next data block arrives at the buffer.

The process state 256 may yield control, for example, when only a portion of the compressed file is sent from the server computer 12 to the consumer's computer 10 and is then interrupted by an outside factor. For example, the system may begin downloading a first image, but interrupt this process to begin downloading other images simultaneously. Thus, the buffer object that receives data from the first image may run out of data prior to receiving more portions of the downloading image file. In this case, the worker thread 140 process 256 will process other decoder objects or sleep until more work arrives. Once the buffer object has received new data, it posts the work to the worker thread so that the decoder object can decode the new data blocks to the bitmap file 120 memory.

Once the data buffer has received new data blocks from the server computer 12, the decoder at state 256 moves from the wait state 325 to state 304 wherein it reads the first data block coming in from the downloading compressed file.

However, if the previously read data block was the last data block in the file at decision state 320, the process state 256 renders the object to the consumer's display at state 330 and the entire process ends at an end state 332.

V. Other Embodiments

While the preferred embodiment is a system for downloading and decoding images from an Internet server, the invention is not so limited. For example, the system of the present invention could be used to download and decode sounds or video in a manner similar to that described above for images.

To download and decode sounds or images across the Internet, a decoder object can be programmed to decompress these types of files instead of image files. The decompressed image or sound files would then be sent to an appropriate program to be played for the user. A decompressed sound file might be sent to a sound mixing program, while a decompressed video file might be sent to a video viewing program on the consumer's computer 10.

One advantage of the present invention is that it has tremendous flexibility to handle many different types of compressed files. The ability to decompress and decode a new data format can be easily integrated into the system of the present invention by authoring a new decoder object with the awareness to decompress the new file format.

VI. Interfaces

A. ITaskAdvise

This interface is called to initialize, terminate and provide the object with processing time.

```
interface ITaskAdvise
    STDMETHOD  Initialize   ( IUnknown* )
    STDMETHOD  Terminate    ( );
    STDMETHOD  IsFinished   ( );
    STDMETHOD  DoWork       ( BOOL, ISyncAdvise*);
    STDMETHOD  GetState     ( ATOM* );
};
```

STDMETHOD ITaskAdvise::Initialize(
  IUnknown punkReserved // Reserved for future use.
);

Parameters punkReserved
  Reserved

Return Values

S_OK
  The object is prepared to receive ITaskAdvise::DoWork( ) calls.

E_FAIL
  The object is unprepared to receive ITaskAdvise::DoWork( ) calls.

Remarks
  This interface informs the called object that it will be periodically given the opportunity to do processing via it's ITaskAdvise::DoWork( ) member.

STDMETHOD ITaskAdvise::Terminate(void);

Return Values

S_OK
  The object was successfully informed it will no longer receive ITaskAdvise::DoWork( ) calls.

Remarks
  Informs the called object that it will no longer be given the opportunity to periodically do processing via it's ITaskAdvise::DoWork( ) member.

STDMETHOD ITaskAdvise::IsFinished(void);

Return Values

S_OK
  The object has finished performing work.

S_FALSE
  The object still desires CPU time.

Remarks
  Called to determine if the implementing object still has use for CPU time via the ITaskAdvise::DoWork( ) member.

STDMETHOD ITaskAdvise::DoWork(
  BOOL fIdle, // True if called on UI thread
  // idle processing time.
ISyncAdvise*pisaWorSite // Site callback.
);

Parameters fIdle
  True if called during UI thread idle processing. See WM_ENTERIDLE.

pisaWorkSite
  An interface implemented by the caller, the object calls back on this interface to inform the caller of the usage of commonly shared resources and take advise if it may continue processing. This interface is also, optionally, used to communicate it's internal state back to the caller.

Return Values

S_OK
  Work is being done.

S_FALSE
  No work is being done.

Remarks
  This member is called to give the object processing time. The implementing object should periodically call ISyncAdvise:OnContinue( ) to determine if it may continue. This provides the caller an opportunity to inform the callee that it should suspend processing. Each call to this method completes an iteration of decompression work. It may take one or more iterations to completely decompress an image.

STDMETHOD ITaskAdvise::GetState(
  ATOM * qatmState // The current state of this object
);

Parameters atmState
  Returns the state of the object as a globally registered Microsoft® Win32 Atom.

Remarks
  This member may be called to determine what state the object is in.

B. ISyncAdvise

This interface is passed to the object by the ITaskAdvise::DoWork() method as a parameter and should be used by the decoder to inform the caller of calls to shared resources and to determine if processing should be prematurely terminated.

```
interface ISyncAdvise {
    STDMETHOD  OnNextState      ( ATOM, BOOL,
                                  ISyncAdvise* );
    STDMETHOD  OnShareWait      ( DWORD dwMilliSeconds );
    STDMETHOD  OnShareFinished  ( );
    STDMETHOD  OnContinue       (BOOL*);
};
```

STDMETHOD ISyncAdvise::OnNextState(
  ATOM atmState, // The new state that the
  // object is in.
  BOOL fFinalState, // Is this state a final state.
ISyncAdvise * qisaCallback // Optional parameter.
);

Parameters atmState
  Inform the site implementing this interface that the object this interface was passed to has changed state.

fFinalState
  The new state that the object has entered is a Final State, and no more work needs to be performed by it. ITaskAdvise::DoWork( ) no longer needs to be called.

qisaCallback
  A site implemented by the calling object. This parameter is optional, if unused should be NULL, and is provided for future implementations.

Return Values

S_OK
 The message was received successfully.
E_FAIL
 The message was not received successfully.
Remarks
 An object receiving ITaskAdvise::DoWork( ) calls uses this method to inform the caller of changes in object state.

STDMETHOD ISyncAdvise::OnShareWait(
DWORD dwtime // Time in milliseconds or INFINITE
);

Parameters
dwtime
 Inform the site implementing this interface that the object this interface was passed to wishes to use a shared resource. This parameter is the time in milliseconds that the caller will wait to be granted access. If it will wait indefinitely it may specify constant INFINITE
Return Values
S_OK
 The object may use a shared resource.
E_ACCESSDENIED
 The object may not use a shared resource.
Remarks
 When the object wishes to use a shared resource, it calls this method before using it so that the OLE 2.0 container can take appropriate measures to make sure that the resource is not in use by other parts of the program.

STDMETHOD ISyncAdvise::OnShareFinished( void );
Return Values
S_OK
 The container was successfully informed.
Remarks
 When the object has concluded use of a shared resource. The OLE 2.0 container may assign the resource to some other task.

STDMETHOD ISyncAdvise::OnContinue(
BOOL* pfContinue // Returns if object may continue to work.
);

Parameters
pfContinue
 Optional parameter returns if the object may continue ITaskAdvise::DoWork( ) processing.
Return Values
 S_OK
  The object may continue working.
 S_FALSE
  The object should yield to the container, thus returning from the ITaskAdvise::DoWork( ) call.
Remarks
 If the object wishes to perform lengthy processing in the ITaskAdvise::DoWork( ) call, it should periodically call this method to obtain permission to do so. The object should be prepared to be denied further processing and should leave the work to a later ITaskAdvise::DoWork( ) call.

C. IImageFilter
 This interface is implemented by a decoder object to return information about the image being decompressed.

interface IImageFilter {
 STDMETHOD GetBitmapInfo
  (LPBITMAPINFOHEADER, DWORD cbSize)
};
STDMETHOD IImageFilter: :GetBitmapInfo(
LPBITMAPINFOREADER pbmihReturn, // Reserved for future use.
DWORD dwSize
);

Parameters
pbimhReturn
 A pointer to a BITMAPINFOHEADER structure, plus space to return a RGBQUAD color table of with each color entry being the size of (RGBQUAD) bytes large, (4 bytes). The number of color entries is specified in the BITMAPINFOHEADER structure. For more information on BITMAPINFOHEADER and RGBQUAD structure's see *Programming Windows 95* (Charles Petzold, Microsoft Press).
dwSize
 The size in bytes of the buffer to receive data. This buffer must be at least sizeof( BITMAPINFO-HEADER ) large. For example a bitmap with a color table of 2 elements would be sizeof( BITMAPIN-FOHEADER )+2*sizeof( RGBQUAD ) bytes large.
Return Values
S_OK
 The function has returned the desired information.
E_PENDING
 Not enough data has been downloaded yet to determine this information.
E_FAIL
 An error has occurred.

VII. CONCLUSION

The system of the present invention provides many advantages over prior download and decoding schemes. As discussed above, the system of the present invention does not have the disadvantages of other systems that used either one thread to download and decode all images, or spawned a new thread for each downloaded file.

By only using a single thread and iterative decoder objects to decode and render several compressed image files simultaneously, the present invention system is much more efficient than other systems. Downloading files are asynchronously transferred from a server to a buffer on the consumer's computer 10. From the buffer, the downloaded file is decoded and sent to a bitmap file 120 for rendering. A rendering object 125 then reads the bitmap file 120 and paints an image to the consumer's computer's 10 display. Because a new rendering object 125, buffer object and decoder object are created for each downloaded file, many images can be rendered to the display simultaneously. This allows the speed advantages of systems that spawn an individual thread to process each new downloaded file, without the overhead of managing all the new threads.

What is claimed is:

1. A method for rendering a plurality of compressed image files transferred to a computer system, comprising:
 a) initiating a first thread on a computer system for downloading a first compressed image file, said first thread including commands for initiating a first decoder module that are specific for decoding the type of said first compressed image file;

b) initiating a second thread on said computer system for downloading a second compressed image file, said second thread including commands for initiating a second decoder module that is specific for decoding the type of said second compressed image file;

c) initiating a third thread on said computer system, said third thread being in communication with said first thread and said second thread, said third thread including commands for instructing said first decoder module and said second decoder module to decompress said first compressed image file and said second compressed image file; and d) rendering the decompressed image files.

2. The method of claim 1, wherein step c) further comprises storing said first and second compressed image files that are decompressed to a bitmap file.

3. The method of claim 2, further comprising accessing a display context prior to storing said first compressed image file to said bitmap file.

4. The method of claim 1, wherein said first compressed image file is transferred across the Internet.

5. The method of claim 1, wherein said first compressed image file is a GIF or a JPEG type file.

6. The method of claim 1, wherein step a) further comprises initializing a first rendering module.

7. The method of claim 6, wherein said first decoder module and said first rendering module are objects.

8. The method of claim 7, wherein said objects are Microsoft OLE 2.0 objects.

9. The method of claim 6, wherein said first rendering module and said first decoder module communicate with said decompressed image files through a synchronization system.

10. The method of claim 1, wherein said first compressed image file and said second compressed image file are transferred across said wide area network through a Microsoft Windows 95 communication Application Program Interface (API).

11. The method of claim 10, wherein said API is the Microsoft Windows 95 URL Moniker API.

12. An apparatus in a computer for decoding encoded files, comprising:

a first thread comprising communication commands, said first thread further comprising commands for initializing a first decoder module for decoding a first encoded file;

a second thread comprising communication commands, said second thread comprising commands for initializing a second decoder module for decoding a second encoded file; and a third thread in communication with said first thread and said second thread for instructing said first decoder module and second decoder module to decode said first encoded file and said second encoded file.

13. The apparatus of claim 12, wherein said first encoded file is an image file.

14. The apparatus of claim 13, wherein said second encoded file is an image file.

15. The apparatus of claim 12, wherein said first encoded file is located on a server computer.

16. The apparatus of claim 15, wherein said server computer is an Internet server.

17. The apparatus of claim 12 further comprising:

an interface between a program and one of the first decoder module and the second decoder module to provide a link to any decoding activity therein.

18. The apparatus of claim 12 further comprising:

an interface between a program and one of the first decoder module and the second decoder module to allow the program to paint any available portion of a requested image to a display.

19. The apparatus of claim 12 further comprising:

an interface to allow a first object within one of the first decoder module and the second decoder module to perform a state inquiry for determining the state of a second object.

20. The apparatus of claim 12 further comprising:

a mechanism to ensure that an object created within a first context is called only from within the first context.

21. A computer readable medium having instructions stored thereon for causing a computer to render a plurality of compressed image files transferred to a computer system, the method comprising:

initiating a first thread on a computer system for downloading a first compressed image file, said first thread including commands for initiating a first decoder module that is specific for decoding the type of said second compressed image file;

initiating a second thread on said computer system for downloading a second compressed image file, said thread including commands for initiating a second decoder module that is specific for decoding the type of said second compressed image file;

initiating a third thread on said computer system, said third thread being in communication with said first thread and said second thread, said third thread including commands for instructing said first decoder module and said second decoder module to decompress said first compressed image file and said second compressed image file; and rendering the decompressed image files.

22. A computer readable medium having instructions stored thereon for causing a computer to perform a method for decoding encoded files comprising:

providing a plurality of encoded files;

initiating a binding thread on a computer, said thread including commands for instantiating a plurality of decoder module types of said computer;

identifying the type of each of said encoded files;

initiating a worker thread having a context;

instantiating one of said decoder module types for each of said encoded files; and operating multiple decoder module types within the context of the worker thread to decode the encoded files.

23. The computer readable medium of claim 22 wherein multiple worker threads are initiated by one or more binding threads to control the decoding of further compressed files wherein at least two decoder modules are operated within the context of at least one of the worker threads.

* * * * *